3,147,235
OPTICAL BRIGHTENING OF VARIOUS FORMS OF POLYAMIDE RESIN

Reinhard Zweidler, Basel, and Hermann Gysling, Riehen, near Basel, Switzerland, assignors to J. R. Geigy A.-G., Basel, Switzerland
No Drawing. Filed June 2, 1959, Ser. No. 817,471
Claims priority, application, Switzerland, June 12, 1958, 60,496
12 Claims. (Cl. 260—78)

The invention concerns a process for the production of synthetic polypeptides in the form of threads, strips and foils and so forth which have an improved appearance in daylight. It also concerns the forms of polypeptide optically brightened according to this new process.

It has now been found that the appearance of synthetic polypeptide forms can be greatly improved in daylight if slight amounts of reactive sulphonyl compounds from the group consisting of the 4-(4.5-arylo-1.2.3-triazolyl-2)-stilbene series are added to the melt of the starting materials before the various forms are made up therefrom.

The brightening agents used according to the invention correspond to the general formula

In this formula,

A represents an arylo radical of the benzene, naphthalene or acenaphthene series which is bound at neighbouring aromatic carbon atoms with the nitrogen atoms of the triazole ring,
B represents a p-phenylene radical which contains in the o-position to the vinylene bridge a negative substituent not imparting colour,
D represents a radical of the benzene series, and
Z represents a reactive radical.

There should only be one sulphonyl group —SO₂—Z present. The radical Z in this group enables it to react with the amino groups of monomeric, low or higher polypeptides or with imide groups of lactams. Thus, within the scope of the present invention, the radical Z represents chiefly: a halogen atom, a hydroxy, alkoxy or aryloxy group and, finally, a possibly low polymeric caprolactam radical of the formula

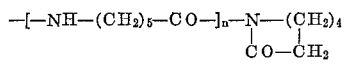

wherein $n$ is a whole number from 0 to 10, or

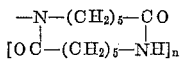

wherein $n$ is 1 or 2.

In the above Formula I the aromatic rings can be further substituted non-ionogenically except by substituents imparting colour. Anionic auxochromes such as the aromatically bound hydroxyl group as well as cation-forming auxochromes, i.e., aromatically bound and possibly substituted amino groups should also not be present. Also other acid salt forming groups, in particular in the form of their metal salts, as well as nitro or aryl azo groups imparting colour should not be present. On the other hand, the aromatic rings A, B and D can be substituted, for example, by halogen, alkyl, alkyl suphonyl, aryl sulphonyl groups and the arylo radical can also be substituted by alkoxy or acylamino groups. Colour imparting polysubstitution of the benzene ring D with strongly positivising substituents in the o- and p-positions with regard to the vinylene group is also excluded.

The negative substituent in B is principally the Z—SO₂ group, also alkyl, aralkyl, aryl sulphonyl groups or secondary or tertiary sulphonic acid amide groups as well as the cyano group, for example, can also be used. If the Z—SO₂ group is not present in B, this sulphonyl substituent can either be linked to D or, advantageously, to A.

A preferred group of brightening agents used according to the invention corresponds to the general Formula II

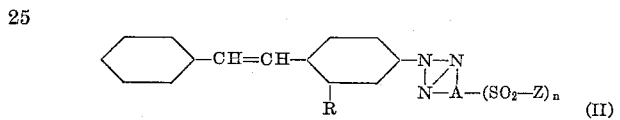

in which

A represents aromatic radicals selected from the group consisting of the benzene, naphthalene and acenapthene series in which two vicinal carbon atoms are bound to the nitrogen atoms of the triazole ring,
Z represents a member selected from the group consisting of halogen, hydroxy, lower alkoxy, mononuclear aryloxy and caprolactam radicals of the formula

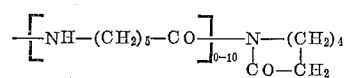

$n$ represents the numerals 0 and 1, and
R represents a member selected from the group consisting of lower alkyl sulphonyl, mononuclear aryl sulphonyl, CN and—in the case where $n$ is zero—the —SO₂—Z group, the aromatic nuclei being free from chromophores, auxochromes and further ionogenic substituents.

In particular, technically interesting compounds are those of the general Formula III

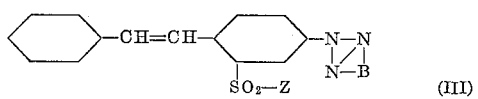

wherein Z represents a member selected from the group consisting of halogen, hydroxy, lower alkoxy, mononuclear aryloxy and caprolactam radicals of the formula

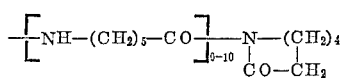

and

B represents a member selected from the group consisting of the radicals

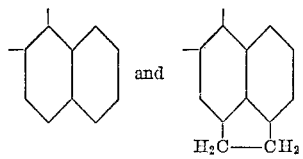

The compounds used according to the invention are obtained most simply from the corresponding known sodium salts of sulphonic acids. The free sulphonic acids are obtained by treating these salts with strong mineral acids, care being taken on using sulphuric acid that more far reaching reactions such as sulphuration etc., are avoided. On treating the sulphonic acids with phosphorus oxychloride in inert organic solvents such as chlorobenzene, the corresponding sulphonic acid chlorides are obtained. These can be used as such or they can be reacted with low alcohols to form sulphonic acid alkyl esters, or with unsubstituted or substituted phenols to form sulphonic acid aryl esters or they can be reacted with caprolactam to form further sulphonyl compounds which can be used according to the invention.

The optically brightened forms of polypeptide are produced, for example, as follows: the brightening agents used acording to the invention are added to monomeric or low polymeric peptides, the mixture is polymerized or polycondensed according to the usual methods and the desired forms are then made from the melt. Also, the reactive sulphonyl compounds can be added only after the polymerisation or polycondensation of the polypeptides whereupon the desired forms are made. The process can also be performed in the so-called masterbatch, i.e, first a so-called concentrate is produced by polymerisation or polycondensation of monomers or low polymers with excess brightening agent and this concentrate is added to the material to be brightened before forming.

The forms of polypeptide treated with the sulphonyl compounds according to the invention have very good fastness to light and a considerably more white appearance in daylight than corresponding material which has not been treated. Very probably the sulphonyl compounds react with the peptide to be brightened while forming sulphonic acid amide groups and are thus fixed so that they are fast to washing.

Only slight amounts of the stilbene compounds used according to the invention are necessary to attain a clearly visible brightening effect on superpolyamide fibers. Even amounts of 0.01 to 0.1%, calculated on the weight of the fibers, are sufficient. It is also remarkable that these stilbene compounds have very good fastness to chlorine. This property is very valuable as superpolyamide fibres are often treated with agents giving off chlorine.

Further details can be seen from the following examples which do not limit the invention in any way. In these examples, parts are given as parts by weight and the temperatures are in degrees centigrade. The relationship of parts by weight to parts by volume is as that of grammes to cubic centimetres.

EXAMPLE 1

400 parts of caprolactam, 40 parts of water, 0.4 part of the sulphonic acid chloride of the formula

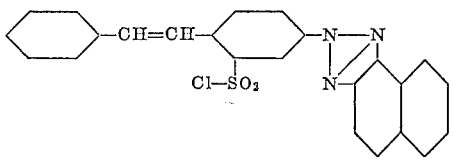

and 1.6 parts of titanium dioxide (anatase) are mixed together and the mixture is heated to about 70° until it becomes liquid. The liquid mixture is poured into a pressure vessel made of stainless steel and heated within 1 hour to about 250° while excluding oxygen whereupon a pressure of about 10–15 atmospheres is obtained. After this time, the water is distilled off and then the polymeric mass is kept for 3 hours at 250° but not under pressure in order to completely remove the gases. The mass thus attains a viscosity which enables the polymer to be forced from a die at the bottom of the pressure vessel by means of nitrogen in the form of strips or filaments. Monomeric particles are removed from the solidified polyamide by extraction with water. The superpolyamide fibre attained by this process is distinguished by a very high degree of whiteness. The brightening agent is fixed so that it is fast to washing and the polyamide fibres the appearance of which has been improved, have good light fastness.

A corresponding, weaker but still visible brightening effect is obtained if in the above example 0.08 part of the sulphonic acid chloride are used.

A good effect is also obtained if in the above example, the sulphonic acid chloride mentioned is replaced by 0.4 part of the free sulphonic acid of the formula

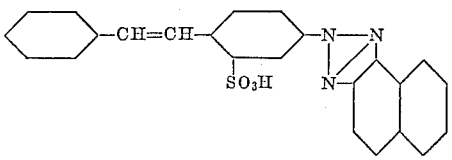

and otherwise the same procedure is followed.

EXAMPLE 2

A mixture of 400 parts of caprolactam, 40 parts of water, 0.4 part of the compound of the formula

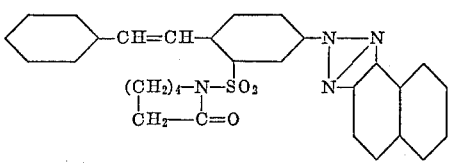

and 1.6 parts of titanium dioxide (anatase) is polymerised in the heat and worked up further as described in Example 1.

The fibres, which are considerably improved in appearance, are distinguished by excellent fastness to washing as well as good fastness to light and chlorine.

If in the above example, the brightening agent is replaced by 0.45 part of the compound of the formula

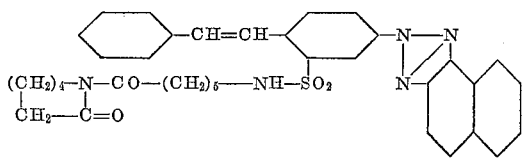

then a similar effect is obtained.

The active ingredients mentioned in the above example are obtained as yellow powders by reacting the 2-(stilbyl-4")-(naphtho-1'.2':4.5)-1.2.3-triazole-2"-sulphonic acid chloride mentioned in Example 1 with excess caprolactam at temperatures of over 120° in the presence of an inert solvent such as chlorobenzene. The first compound mentioned melts at 113–115° uncorrected and the second at 216–218° uncorrected.

EXAMPLE 3

300 parts of hexane diamine adipate are dissolved in 300 parts of distilled water at about 80°. 1.8 parts of sebacic acid, 1.2 parts of titanium dioxide (anatase) and 0.3 part of the 2-(stilbyl-4")-(naphtho-1'.2':4.5)-1.2.3-triazole-2"-sulphonic acid chloride mentioned in Example 1 are added to this solution and the whole is stirred until a homogeneous distribution is attained. The liquid mixture is poured into the autoclave, which has been heated to about 150°, while excluding oxygen, and the temperature is raised to 280° within 1 hour. During this time, the pressure in the autoclave is kept under 30 atmospheres by distilling off the steam. After attaining the maximum temperature of 280–290°, atmospheric pressure is attained within 10–20 minutes by distilling off the volatile portions. The mass is then kept for 4 hours at 280° under atmospheric pressure while excluding oxygen. After this time the condensation has so proceeded that the polycondensate can be spun by means of nitrogen through a die in the floor of the autoclave.

The superpolyamide fibres so obtained have a strong white shading which has very good fastness to washing.

If in the above example the sulphonic acid chloride mentioned is replaced by 0.4 part of 2-(stilbyl-4")-(naphtho-1'.2':4.5) - 1.2.3 - triazole-2"-sulphonic acid methyl ester, then a similar white effect is obtained.

The 2 - (stilbyl-4")-(naphtho-1'.2':4.5)-1.2.3-triazole-2"-sulphonic acid methyl ester is obtained from the corresponding sulphonic acid chloride with methyl alcohol in the presence of an inert solvent such as chlorobenzene. It is a yellowish powder which melts at 149–152° uncorrected.

EXAMPLE 4

0.3 part of the sulphonic acid chloride of the formula

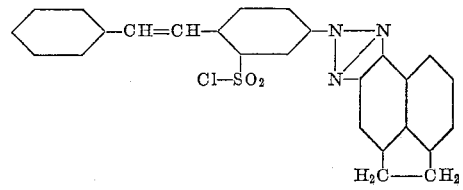

(M.P. 225—227° uncorrected), 400 parts of caprolactam, 40 parts of water and 1.6 parts of titanium dioxide (anatase) are mixed together and the mixture is heated at 70° until it becomes liquid. The liquid mass is polymerised in a stainless steel autoclave at about 250° as described in Example 1 and the polymer is then spun through the die. The superpolyamide fibre so obtained has a very high degree of whiteness, excellent fastness to washing, good fastness to light and good fastness to chlorine.

A similar effect is obtained if in the above example the sulphonic acid chloride mentioned is replaced by 0.3 part of the free sulphonic acid of the formula

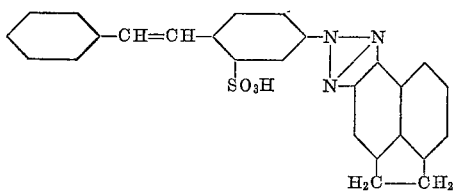

and otherwise the same procedure is followed.

On the other hand, 0.3 part of the sulphonic acid chloride mentioned above can be stirred with 300 parts of hexane diamine adipate, 1.8 parts of sebacic acid and 1.2 parts of titanium dioxide (anatase) and 300 parts of distilled water and then polymerised as described in Example 3. The fibres obtained after spinning the polymerisation product is distinguished by a high degree of whiteness. The brightening agent is fixed fast to boiling.

EXAMPLE 5

1000 parts of granulated polycaprolactam are mixed by rolling for 3 hours in a well closed vessel with 1 part of the 2 - (stilbyl-4")-(naphtho-1'.2':4.5)-1.2.3-triazole-2"-sulphonic acid chloride mentioned in Example 1. The granulate is then melted in a stainless steel pressure vessel while excluding oxygen and is then expressed by means of nitrogen from a slit shaped die in the bottom of the vessel at a temperature of 245° in the form of an endless strip 5 mm. wide and 0.3 mm. thick. The strip so obtained has a very high degree of whiteness and the brightening agent is fixed fast to boiling.

A similar effect is obtained if the sulphonic acid chloride mentioned in the above example is replaced by 1.7 parts of a precondensation product from 10 parts of 2-(stilbyl-4")-(naphtho-1'.2.:4.5) - 1.2.3 - triazole-2"-sulphonic acid chloride and 9 parts of caprolactam.

If instead of the substances mentioned in these examples, about the same amounts of the compounds listed in the following tables are used and otherwise the same procedure is followed, then forms the superpolyamide the appearance of which has been improved in a similar way are obtained.

*Table 1*

| X= | R= | Appearance of forms of polyamide in UV light |
|---|---|---|
| —O—C₂H₅ | —H | Blue-violet. |
| —O—C₃H₇ | —H | Do. |
| —O—⟨phenyl⟩ | —H | Do. |
| —O—⟨phenyl⟩—CH₃ | —H | Do. |
| —OH | 4-O—CH₃ | Do. |
| —Cl | 4-O—CH₃ | Do. |
| —Cl | 5-O—CH₃ | Do. |
| —O—CH₃ | 7-O—CH₃ | Do. |

Table 2

Products of the formula

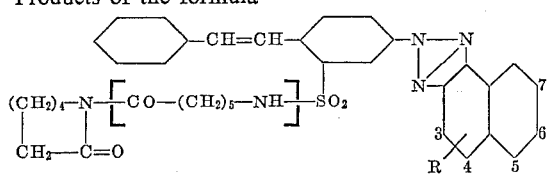

| n= | R= | Appearance of forms of super-polyamide in UV light |
|---|---|---|
| 0 | 4-CH₂—CH₂-5 | Blue-violet. |
| 1 | 4-CH₂—CH₂-5 | Do. |
| 0 | 4-O—CH₃ | Do. |
| 1 | 4-O—CH₃ | Do. |
| 0 | 6-O—CH₃ | Do. |
| 1 | 7-O—CH₃ | Do. |

Table 3

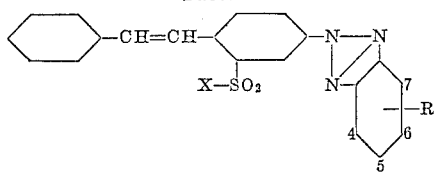

Table 3—Continued

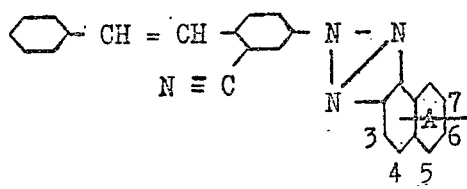

| X= | R= | Appearance of forms of polyamide in UV light |
|---|---|---|
| —OH | 5-CH₃, 6-O—CH₃ | Blue violet. |
| —Cl | 5-CH₃, 6-O—CH₃ | Do. |
| —O—CH₃ | 5-CH₃, 6-O—CH₃ | Do. |
| —O—⌬—CH₃ | 5-CH₃, 6-O—CH₃ | Do. |
| —OH | 5,6—O—CH₃ | Do. |
| —Cl | 5,6—O—CH₃ | Do. |
| —O—⌬ | 5,6—O—CH₃ | Do. |
| —OH | 5-Cl, 6-O—CH₃ | Do. |
| —Cl | 5-Cl, 6-O—CH₃ | Do. |
| —O—CH₃ | 5-Cl, 6-O—CH₃ | Do. |

Table 4

Products of the formula

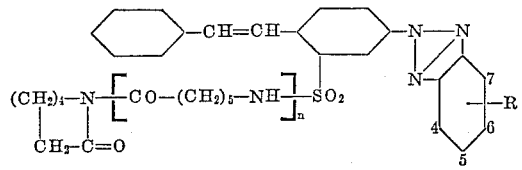

| n= | R= | Appearance of forms of super-polyamide in UV light |
|---|---|---|
| 0 | 5-CH₃, 6-O—CH₃ | Blue-violet. |
| 1 | 5-CH₃, 6-O—CH₃ | Do. |
| 0 | 5-Cl, 6-O—CH₃ | Do. |
| 1 | 5-Cl, 6-O—CH₃ | Do. |
| 0 | 5,6-O—CH₃ | Do. |
| 1 | 5,6-O—CH₃ | Do. |

Table 5

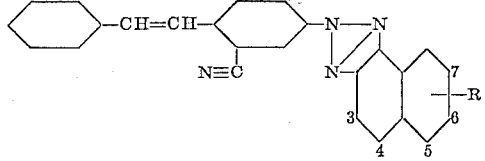

| R= | Appearance of superpoly-amide forms in UV light |
|---|---|
| 4-SO₃H | Blue-violet. |
| 4-SO₂—Cl | Do. |
| 4-SO₂—O—CH₃ | Do. |
| 4-SO₂—O—⌬—CH₃ | Do. |
| 5-SO₃H | Do. |
| 5-SO₂—Cl | Do. |
| 5-SO₂—O—C₂H₅ | Do. |
| 6-SO₃H | Do. |
| 6-SO₂—Cl | Do. |
| 6-SO₂—O—CH₃ | Do. |
| 7-SO₂—Cl | Do. |
| 7-SO₂—O—⌬ | Do. |

Table 6

Products of the formula

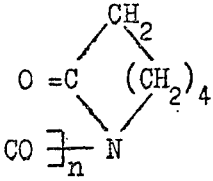

| n | A | Appearance of forms of super polyamide in UV light |
|---|---|---|
| 0 | 4 | Blue-violet. |
| 1 | 4 | Do. |
| 0 | 5 | Do. |
| 1 | 5 | Do. |
| 0 | 6 | Do. |
| 1 | 6 | Do. |
| 0 | 7 | Do. |

Table 7

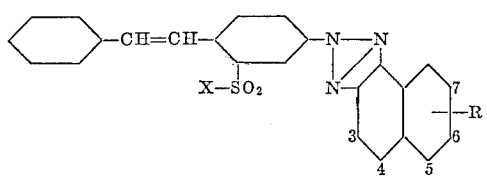

| X= | R= | Appearance of superpoly-amide fibres in UV light |
|---|---|---|
| —CH₃ | 4-SO₃H | Blue-violet. |
| —CH₃ | 4-SO₂—Cl | Do. |
| —CH₃ | 5-SO₂—Cl | Do. |
| —⌬—CH₃ (CH₃) | 6-SO₃H | Do. |
| —CH₃ | 6-SO₂—Cl | Do. |
| —⌬—CH₃ (CH₃) | 7-SO₂—Cl | Do. |

Table 8

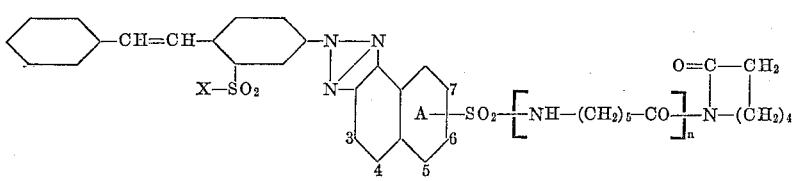

| X= | A= | n= | Appearance of superpoly-amide fibres in UV light |
|---|---|---|---|
| —CH₃ | 4 | 0 | Blue-violet. |
| —CH₃ | 4 | 1 | Do. |
| —CH₃ | 5 | 0 | Do. |
| 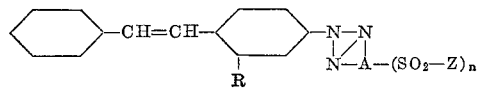 | 5 | 1 | Do. |
|  | 6 | 1 | Do. |
| —CH₃ | 7 | 0 | Do. |

What we claim is:

1. The method of optically brightening synthetic polymer which comprises incorporating into the liquid melt of a member selected from the group consisting of monomeric caprolactam and hexane diamine adipate, from about 0.01 to about 0.1% by weight of compound of the formula

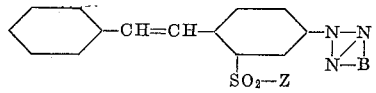

wherein

A represents a member selected from the group consisting of aromatic radicals of the benzene, naphthalene and acenaphthene series in which two vicinal carbon atoms are bound to nitrogen atoms of the $$-N-N$$
$$\phantom{-N}N-$$

ring,

Z represents a member selected from the group consisting of halogen, hydroxy, lower alkoxy, phenyloxy and caprolactam radicals of the formula

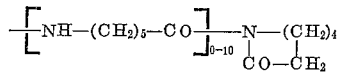

$n$ represents one of the numerals 0 and 1, and

R represents a member selected from the group consisting of lower alkyl sulphonyl, phenyl sulphonyl, CN and—in the case where $n$ is zero—the —SO₂—Z group, the aromatic nuclei of all aromatic radicals being free from chromophores, auxochromes and further ionogens, and heating the mixture to 245–290° C. while maintaining the said mixture in liquid melt state and with exclusion of oxygen until polymer formation is complete, whereby optically brightened synthetic polymer which is extrudable into the form of fibers, strips and the like is obtained.

2. The method of optically brightening synthetic polymer which comprises incorporating into the liquid melt of a member selected from the group consisting of monomeric caprolactam and hexane diamine adipate, from about 0.01 to about 0.1% by weight of compound of the formula

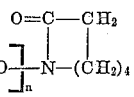

wherein

Z represents a member selected from the group consisting of halogen, hydroxy, lower alkoxy, phenyloxy and caprolactam radicals of the formula

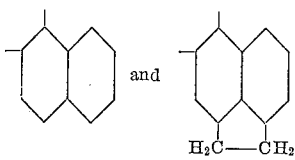

and

B represents a member selected from the group consisting of the radicals

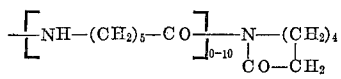

and heating the mixture to 245–290° C. while maintaining the said mixture in liquid melt state and with exclusion of oxygen until polymer formation is complete, whereby optically brightened synthetic polymer which is extrudable into the form of fibers, strips and the like is obtained.

3. The method of optically brightening synthetic polymer which comprises incorporating into the liquid melt of a member selected from the group of consisting of monomeric caprolactam and hexane diamine adipate, from about 0.01 to about 0.1% by weight of compound of the formula

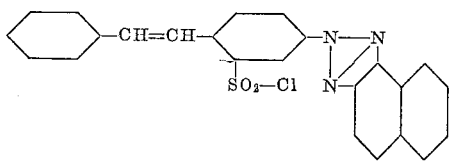

and heating the mixture to 245–290° C. while maintaining the said mixture in liquid melt state and with exclusion of oxygen until polymer formation is complete, whereby optically brightened synthetic polymer which is extrudable into the form of fibers, strips and the like is obtained.

4. The method of optically brightening synthetic polymer which comprises incorporating into the liquid melt of a member selected from the group consisting of monomeric caprolactam and hexane diamine adipate, from about 0.01 to about 0.1% by weight of compound of the formula

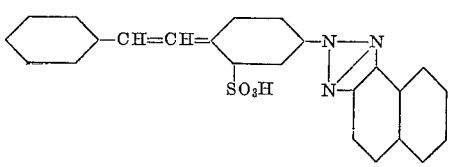

and heating the mixture to 245–290° C. while maintaining the said mixture in liquid melt state and with exclusion of oxygen until polymer formation is complete, whereby optically brightened synthetic polymer which is extrudable into the form of fibers, strips and the like is obtained.

5. The method of optically brightening synthetic polymer which comprises incorporating into the liquid melt of a member selected from the group consisting of monomeric caprolactam and hexane diamine adipate, from about 0.01 to about 0.1% by weight of compound of the formula

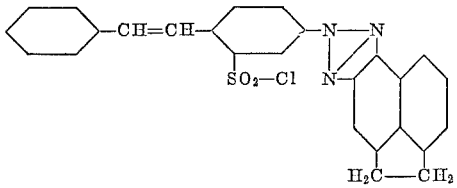

and heating the mixture to 245–290° C. while maintaining the said mixture in liquid melt state and with exclusion of oxygen until polymer formation is complete, whereby optically brightened synthetic polymer which is extrudable into the form of fibers, strips and the like is obtained.

6. The method of optically brightening synthetic polymer which comprises incorporating into the liquid melt of a member selected from the group consisting of monomeric caprolactam and hexane diamine adipate, from about 0.01 to about 0.1% by weight of compound of the formula

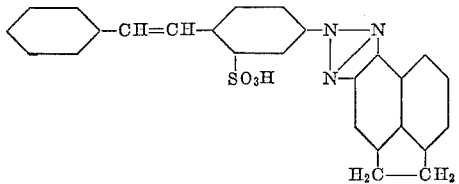

and heating the mixture to 245–290° C. while maintaining the said mixture in liquid melt state and with exclusion of oxygen until polymer formation is complete, whereby optically brightened synthetic polymer which is extrudable into the form of fibers, strips and the like is obtained.

7. The method of optically brightening synthetic polymer which comprises incorporating into the liquid melt of a member selected from the group consisting of monomeric caprolactam and hexane diamine adipate, from about 0.01 to about 0.1% by weight of compound of the formula

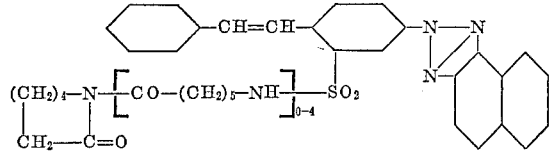

and heating the mixture to 245–290° C. while maintaining the said mixture in liquid melt state and with exclusion of oxygen until polymer formation is complete, whereby optically brightened synthetic polymer which is extrudable into the form of fibers, strips and the like is obtained.

8. The method according to claim 1 wherein the monomer is caprolactam and the polymer is polycaprolactam.

9. The method according to claim 1 wherein the monomer is hexane diamine adipate and the polymer is polycondensed hexane diamine adipate.

10. The method of optically brightening synthetic polymer which comprises intimately admixing granulated synthetic polymer selected from the group consisting of polycaprolactam and polycondensed hexane diamine adipate with from about 0.01 to about 0.1% by weight of compound of the formula

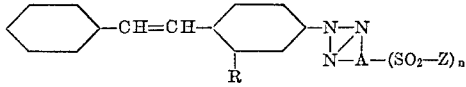

wherein

A represents a member selected from the group consisting of aromatic radicals of the benzene, naphthalene and acenaphthene series in which two vicinal carbon atoms are bound to nitrogen atoms of the

Z represents a member selected from the group consisting of halogen, hydroxy, lower alkoxy, phenyloxy and caprolactam radicals of the formula

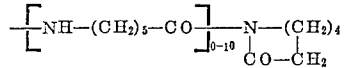

$n$ represents one of the numerals 0 and 1, and

R represents a member selected from the group consisting of lower alkyl sulphonyl, phenyl sulphonyl, CN and—in the case where $n$ is zero—the $-SO_2-Z$ group, the aromatic nuclei of all aromatic radicals being free from chromophores, auxochromes and further ionogens, and heating the mixture to 245–290° C., in a closed vessel, with exclusion of oxygen whereby a liquid melt is obtained which is extrudable into the form of optically brightened fibers, strips and the like.

11. The method according to claim 10 wherein the polymer is polycaprolactam.

12. The method according to claim 10 wherein the polymer is polycondensed hexane diamine adipate.

References Cited in the file of this patent

UNITED STATES PATENTS

| | | |
|---|---|---|
| 2,630,421 | Stamatoff | Mar. 3, 1953 |
| 2,713,057 | Zweidler et al. | July 12, 1955 |
| 2,739,081 | Wohnsiedler et al. | Mar. 20, 1956 |
| 2,784,183 | Keller et al. | Mar. 5, 1957 |
| 2,849,446 | Sullivan | Aug. 26, 1958 |
| 2,901,476 | Gold et al. | Aug. 25, 1959 |
| 2,992,206 | Youle et al. | July 11, 1961 |